(12) United States Patent
Alegre

(10) Patent No.: US 6,193,454 B1
(45) Date of Patent: Feb. 27, 2001

(54) PAWL CONSTRUCTION AND METHOD

(75) Inventor: Jose Luis Alegre, Caracas (VE)

(73) Assignee: Multiprens C.A., Caracass (VE)

( * ) Notice: Subject to any disclaimer, the term of this patent is extended or adjusted under 35 U.S.C. 154(b) by 0 days.

(21) Appl. No.: 09/301,832

(22) Filed: Apr. 29, 1999

(51) Int. Cl.⁷ .................................................. B60P 7/08
(52) U.S. Cl. ........................................ 410/103; 410/100
(58) Field of Search ............................ 410/12, 97, 100, 410/101, 103; 24/68 CD, 265 CD; 248/499; 254/217, 218, 223, 376, DIG. 12

(56) References Cited

U.S. PATENT DOCUMENTS

| | | | |
|---|---|---|---|
| 2,895,714 | * 7/1959 | Clark | 410/103 |
| 3,101,927 | * 8/1963 | Gray | 410/103 |
| 3,697,045 | * 10/1972 | Farley | 410/103 |
| 5,145,299 | * 9/1992 | Stephenson, Jr, | 410/100 |
| 5,490,749 | 2/1996 | Arbues | 410/103 |
| 5,664,918 | * 9/1997 | Heider et al. | 410/103 |
| 5,853,164 | 12/1998 | Hunt . | |
| 5,860,777 | * 1/1999 | Walsh et al. | 410/100 |

* cited by examiner

Primary Examiner—Stephen T. Gordon
(74) Attorney, Agent, or Firm—Shook, Hardy & Bacon LLP

(57) ABSTRACT

A pawl of the type used to lock a ratchet wheel in a cargo restraint winch system, and a method of constructing the pawl. Two planar plates are constructed, one having a projecting fin which is bent at a right angle to provide a finger tab for facilitating release of the pawl from the ratchet wheel. The plates are welded flatly together to form the pawl. Teeth on the pawl are staggered and located in offset planes.

15 Claims, 1 Drawing Sheet

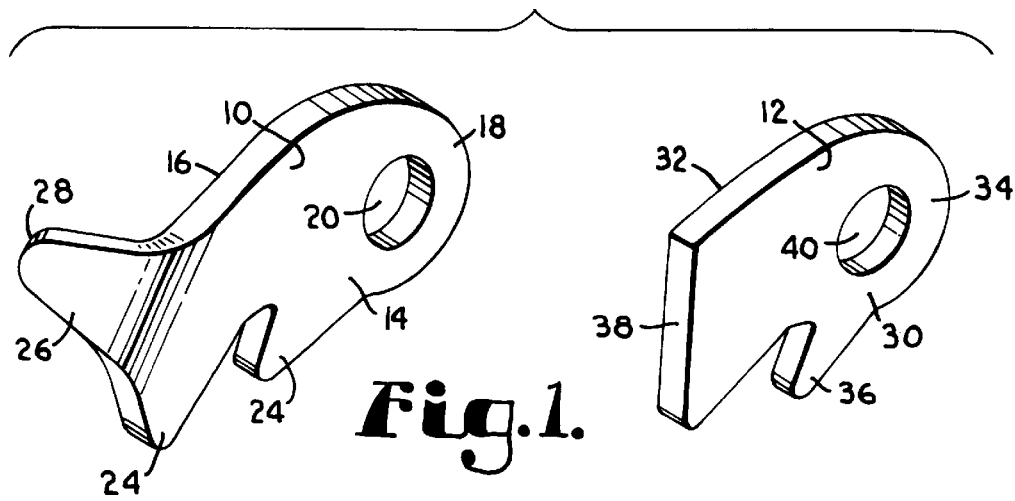
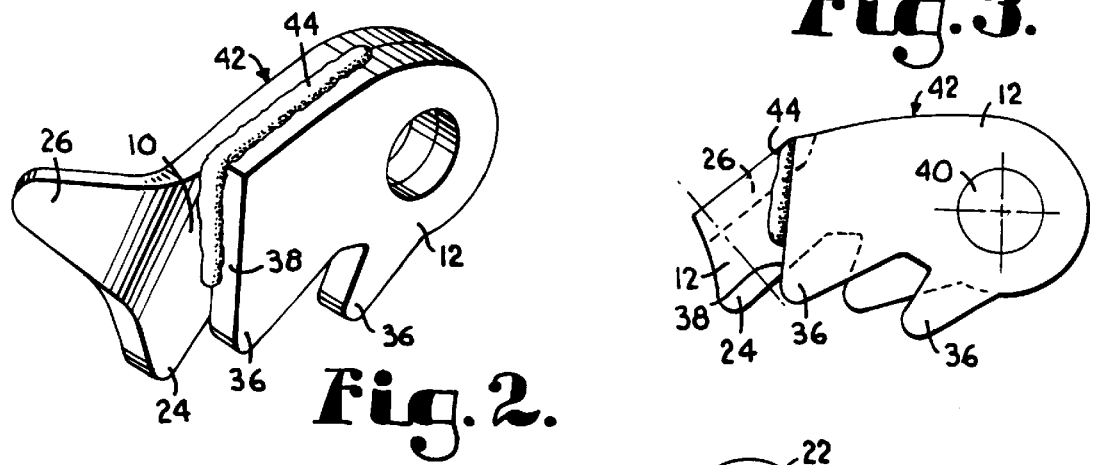
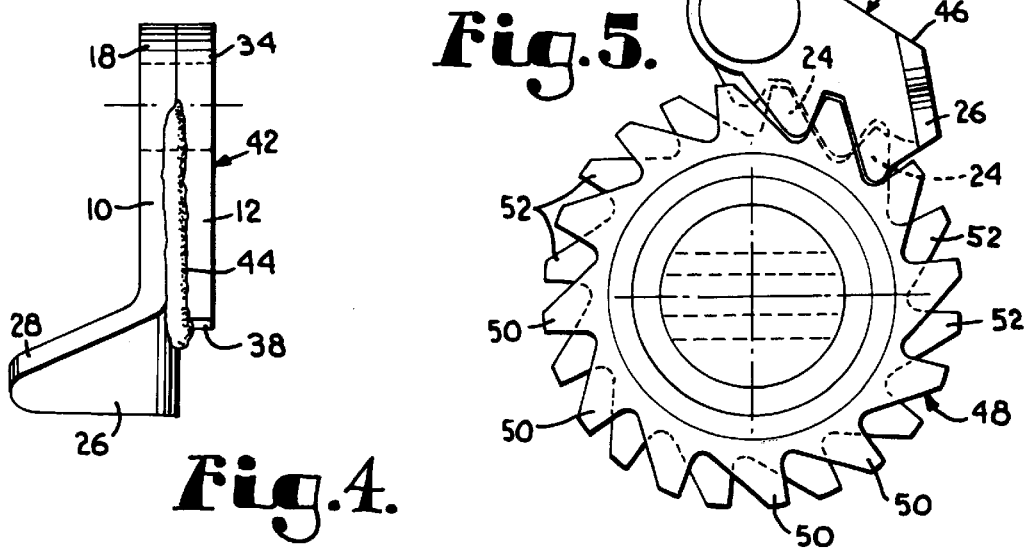

PAWL CONSTRUCTION AND METHOD

FIELD OF THE INVENTION

This invention relates generally to winches of the type used to restrain cargo in place on trucks and other vehicles. More particularly, the invention deals with an improved pawl for use with this type of winch and with a method of constructing the pawl.

BACKGROUND OF THE INVENTION

U.S. Pat. No. 5,490,749 to Arbues discloses a ratchet and pawl construction which is useful in a cargo restraint system employing a winch and a cargo strap to secure the cargo in place on a flatbed truck. The ratchet wheel and pawl have teeth which are located in offset planes and staggered so that the forces that are applied during service are distributed among different teeth which are offset linearly and situated in different planes. This type of ratchet and pawl mechanism exhibits enhanced structural integrity of the mechanical parts and minimizes the failure of the teeth on the ratchet wheel and pawl.

However, one problem that has been encountered is that the tip of the pawl provides only a small area for gripping with the finger in order to release the pawl from the ratchet wheel. Release of the pawl requires this small tip to be squeezed between the thumb and forefinger and pulled in a direction to pivot the pawl out of engagement with the ratchet wheel. The tip surfaces which are gripped are in the same plane that the pivotal movement of the pawl takes place, so the fingers can easily slip along the tip of the pawl. This problem can make it difficult to release the pawl, especially because the winch is typically tightened with considerable force to assure that the cargo is properly restrained. Thus, a relatively large force must normally be overcome in order to release the pawl from the ratchet wheel.

SUMMARY OF THE INVENTION

The present invention is directed to an improved pawl and to a method of constructing the pawl. The principal goal of the invention is to provide a pawl which can be easily released from the ratchet wheel and which can be fabricated in a simple and inexpensive manner.

More specifically, it is an object of the invention to provide a pawl which has a finger tab extending out of the plane of the pawl body so that the tab can function essentially as a crank handle to facilitate release of the pawl from the ratchet wheel of the winch system. Preferably, the finger tab is bent at about 90° to the pawl body so that it is readily accessible and can be easily manipulated with the finger without the need to apply undue force for release of the pawl.

Another object of the invention is to provide a method of constructing a pawl in a simple and economical manner while providing a release tab on the tip of the pawl. In this regard, a pair of planar pawl sections are first constructed and are secured face to face to form the pawl body. One of the pawl sections has a fin that is bent at a right angle from the tip of the pawl to provide a finger tab for easily releasing the pawl from the ratchet wheel.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a perspective view showing a pair of plates which are specially shaped and may be connected together to form a pawl body in accordance with a preferred embodiment of the present invention;

FIG. 2 is a perspective view showing the two plates welded together to form the pawl;

FIG. 3 is a side elevational view of the pawl shown in FIG. 2;

FIG. 4 is a top elevational view of the pawl shown in FIG. 2;

FIG. 5 is a side elevational view showing the pawl of the present invention engaged to lock a ratchet wheel of a cargo restraint winch system in place.

DETAILED DESCRIPTION OF THE INVENTION

The present invention is directed to a method of constructing a pawl of the type disclosed in U.S. Pat. No. 5,490,749 to Arbues which is incorporated herein by reference and to which reference may be made for a more detailed understanding of the type of cargo restraint winch system to which the invention relates.

With initial reference to FIG. 1 in particular, a pawl may be constructed in accordance with the present invention by first constructing a pair of generally planar plates 10 and 12 having irregular perimeters. Preferably, the two plates 10 and 12 are formed in a punching operation from steel. Plate 10 is the larger of the two plates. Plate 10 has initially flat opposite sides 14 and 16 and a rounded head portion 18 at one end. An opening 20 is formed in the head portion 18 for the receipt of a pin 22 (see FIG. 5) which is used to pivotally mount the pawl, as will be explained more fully.

The lower edge of plate 10 includes a pair of spaced apart teeth 24 located one behind the other. At the tail end of plate 10 opposite the rounded head 18, the upper edge of the plate includes a projecting fin 26 having a rounded edge 28 on its tip. The fin 26 tapers as it extends away from the main body of plate 10 toward the tip 28. The fin 26 is bent out of the plane of the remainder of plate 10, preferably to extend at a right angle to the rest of the plate and its flat opposite sides 14 and 16. The sidewardly bent fin 26 provides a finger tab to facilitate release of the pawl in a manner that will be described more fully.

With continued reference to FIG. 1 in particular, the other plate 12 in part has a similar shape to plate 10 but is smaller than plate 10. Plate 12 has flat opposite sides 30 and 32 and a rounded head portion 34 which coincides in size and shape with the rounded head portion 18 of plate 10. The lower edge of plate 12 includes a pair of spaced apart teeth 36 which are similar in size and shape to the teeth 24 but are at offset locations relative to teeth 24. Plate 12 has an upper edge which substantially coincides in its shape and location with the forward upper edge portion of plate 10. The tail end of plate 12 opposite the rounded head 34 provides a substantially straight edge 38 that merges at its lower end with the back edge of the rear tooth 36. The head portion 34 of plate 12 has a round opening 40 that coincides in its size and location with opening 20.

In accordance with the present invention, the two plates 10 and 12 are secured flatly against one another in order to form a pawl 42 (see FIG. 2 in particular). Preferably, the connection of the plates 10 and 12 is carried out by placing the flat sides 14 and 32 against one another and welding the two plates together, as by means of the weld bead 44 shown in FIG. 2. The weld bead 44 may extend along the coincident upper edge portions of plates 10 and 12 and may extend along the rear edge 38 of plate 12 and the adjacent flat side 14 of plate 10. It should be understood that other types and locations of welding operations can be used and that the plates 10 and 12 can be secured other than by welding them together. When the plates are connected, the fin 26 is located well past the rear edge 38 of plate 12.

Preferably, the plates 10 and 12 are constructed of steel or another metal in order to exhibit the required strength of the pawl 42. When the plates are connected to form pawl 42, the openings 20 and 40 are coincident to receive the pin 22. As best shown in FIG. 3, the teeth 36 of plate 12 are staggered or offset in a linear direction relative to the teeth 24 of plate 10. Thus, the teeth 36 are located relative to teeth 24 in an alternating pattern, with one of the teeth 36 being the first tooth, one of the teeth 24 being the second tooth, the other tooth 36 being the third tooth and the other tooth 24 being the final tooth from front to back. By reason of the two plates 10 and 12 being connected flatly against one another side to side, the teeth 36 are located in a different plane from the teeth 24. This arrangement has the advantage of distributing the forces that are applied to the teeth both linearly along the length of the pawl and in different planes, the planes occupied by the two plates 10 and 12.

It should be noted that the fin 26 may be bent at a right angle to the rest of plate 10 either before or after the two plates 10 and 12 are secured together. It has been found to be convenient to bend fin 26 prior to welding of the two plates together, but the invention also contemplates bending fin 26 after the plates have been joined.

With reference to FIG. 5, the pawl 42 is pivoted by pin 22 to one of the sides 46 of a bracket which is used to mount a winch (not shown) of the type used with a cargo restraint strap (also not shown) to secure cargo on a flat bed vehicle, as disclosed in the aforementioned U.S. Pat. No. 5,490,749 to Arbues. A ratchet wheel 48 is mounted below the pawl 42 on the horizontal drum of the winch. The ratchet wheel 48 has teeth 50 and 52 which are staggered and located in offset planes so that the teeth 50 can mate with teeth 24 and teeth 52 can mate with teeth 36 of the pawl. The pawl 42 locks the ratchet wheel 48 against rotation and thus secures the cargo strap tightly around the cargo when the winch is tightened adequately.

The pawl 42 of the present invention is specially constructed to allow it to be easily released from the ratchet wheel 48. In this regard, the fin 26 provides a readily accessible finger tab. In order to release the pawl, the underside of the tab or fin 26 can be engaged with the finger and pushed generally upwardly to pivot pawl 42 about pin 22 in a direction away from the ratchet wheel. Because the fin 26 projects out of the plane of the pawl body, it provides what is essentially a crank handle that allows the finger to exert enough pressure to easily release the pawl from the ratchet wheel, even when the winch is tightened with considerable force. Thus, the present invention provides an improved pawl which may be released from a ratchet wheel more easily than other pawls used in this application in the past. In addition, the present invention provides a method of constructing a pawl by initially forming two planar plates and securing them together, with a finger tab being bent from one of the plates either before or after the plates are secured (as by welding or other known techniques).

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A method of constructing a pawl for interaction with a toothed ratchet wheel in a cargo tie down winch system, said method comprising:

constructing a first substantially planar plate having an irregular perimeter;

constructing a second substantially planar plate having an irregular perimeter and a fin adjacent one end of said second plate, at least one of said first and second plates having a tooth for mating with said ratchet wheel;

securing said first and second plates flatly together with said fin projecting beyond the first plate to form a pawl body; and bending said fin to project beyond the plane of said second plate to provide a finger tab to facilitate release of the pawl body from the ratchet wheel, said bending step being effected either before or after said securing step.

2. A method as set forth in claim 1, wherein said securing step comprises welding said first and second plates flatly together.

3. A method as set forth in claim 1, wherein said bending step is effected before said securing step.

4. A method as set forth in claim 3, wherein said securing step comprises welding said first and second plates flatly together.

5. A method as set forth in claim 1, wherein said bending step comprises bending said fin to extend at substantially a right angle to the plane of said second plate.

6. A method as set forth in claim 1, wherein:

each of said first and second plates has a tooth thereon; and said securing step comprises securing said first and second plates flatly together with the teeth thereof offset from one another.

7. A method as set forth in claim 1, wherein:

each of said first and second plates has a pair of teeth thereon; and said securing step comprises securing said first and second plates flatly together with the teeth of said first plate staggered relative to the teeth of said second plate in an alternating pattern therewith.

8. A method of constructing a pawl for interaction with a toothed ratchet wheel, comprising the steps of:

constructing a first generally planar plate having an irregular perimeter which presents at least one projecting pawl tooth;

constructing a second generally planar plate having an irregular perimeter which presents at least one projecting pawl tooth and a projecting fin;

securing said first and second plates flatly together with the tooth of said first plate being offset from the tooth of said second plate and with said fin extending beyond said first plate; and bending said fin to project beyond the plane of said second plate to provide a finger tab to facilitate release the pawl teeth from the ratchet wheel, said bending step being effected either before or after said securing step.

9. A method as set forth in claim 8, wherein said securing step comprises welding said first and second plates flatly together.

10. A method as set forth in claim 8, wherein said bending step is effected before said securing step.

11. A method as set forth in claim 10, wherein said securing step comprises welding said first and second plates flatly together.

12. A method as set forth in claim 8, wherein said bending step comprises bending said fin to extend at substantially a right angle to the plane of said second plate.

13. A method as set forth in claim 8, wherein:
each of said first and second plates has a pair of teeth thereon; and
said securing step comprises securing said first and second plates flatly together with the teeth of said first plate staggered relative to the teeth of said second plate in an alternating pattern therewith.

14. A method as set forth in claim 13, wherein said securing step comprises welding said first and second plates flatly together.

15. A method as set forth in claim 13, wherein said bending step comprises bending said fin to extend at substantially a right angle to the plane of said second plate.

* * * * *